United States Patent [19]

Weilant et al.

[11] Patent Number: 5,584,776
[45] Date of Patent: Dec. 17, 1996

[54] TRANSFER CASE HAVING PARALLEL CLUTCHES AND LOCKUP FEATURE

[75] Inventors: David R. Weilant; Jack F. Engle, both of Muncie, Ind.

[73] Assignee: Borg-Warner Automotive, Inc., Sterling Heights, Mich.

[21] Appl. No.: 409,774

[22] Filed: Mar. 24, 1995

[51] Int. Cl.$^6$ ................................................ B60K 17/342
[52] U.S. Cl. ............................ 475/213; 475/207; 475/298; 74/665 GE; 180/233; 180/247; 192/3.52; 192/35; 192/48.2
[58] Field of Search .................................... 475/207, 210, 475/213, 298; 74/665 GE, 665 F; 180/233, 247; 192/3.52, 35, 48.2, 48.4, 48.5, 48.7, 48.8, 53.2, 54.4, 54.52

[56] References Cited

U.S. PATENT DOCUMENTS

| | | | |
|---|---|---|---|
| 4,723,459 | 2/1988 | Yoshinaka et al. | 74/665 GE X |
| 4,804,061 | 2/1989 | Kameda | 180/247 |
| 5,105,902 | 4/1992 | Wilson et al. | 180/247 |
| 5,159,847 | 11/1992 | Williams et al. | 74/337.5 |
| 5,215,160 | 6/1993 | Williams et al. | 180/197 |
| 5,275,252 | 1/1994 | Sperduti et al. | 180/197 |
| 5,286,238 | 2/1994 | Shimizu et al. | 180/247 X |
| 5,330,030 | 7/1994 | Eastman et al. | 180/233 |
| 5,380,255 | 1/1995 | Brissenden et al. | 180/247 X |

FOREIGN PATENT DOCUMENTS

| | | |
|---|---|---|
| 2149363 | 6/1985 | United Kingdom . |
| WO86/02981A | 5/1986 | WIPO . |

*Primary Examiner*—Richard M. Lorence
*Attorney, Agent, or Firm*—Willian Brinks Hofer et al; Greg Dziegielewski

[57] ABSTRACT

A transfer case includes a clutch assembly having a disc pack clutch, a cone clutch and a lockup hub or collar. All three clutch components are disposed in mechanical parallel between the primary transfer case shaft and the secondary output. The disc pack clutch includes a plurality of interleaved discs and an electromagnetic operator which effects compression of the disc pack to transfer torque from the primary transfer case output shaft to a chain drive sprocket, through a chain, to a secondary output shaft. The cone clutch is disposed adjacent the disc pack and is also actuated by the electromagnetic operator. The cone clutch includes a conical drive member driven by the primary transfer case output shaft. A conical driven member provides torque to the drive chain and, in turn, to the secondary output shaft. Preferably, the driven cone member is integrally formed with the chain drive sprocket. Splined to the conical drive member is a axially moveable lockup hub or clutch collar having gear teeth, splines or, in an alternate embodiment, lugs which mate with complementary gear teeth or splines on the chain drive sprocket. Preferably, a second operator translates the lockup hub.

20 Claims, 4 Drawing Sheets

TRANSFER CASE HAVING PARALLEL CLUTCHES AND LOCKUP FEATURE

BACKGROUND OF THE INVENTION

Virtually every full-time or part-time four-wheel drive consumer vehicle, i.e., passenger car, truck or sport utility vehicle utilizes a transfer case to continuously or selectively direct a portion of the drive torque to a secondary driveline and drive wheels. Given the increased popularity of trucks and four-wheel drive vehicles, significant and increasing attention has been directed to the mechanical configuration of transfer cases.

One of the areas of development relates to the control of torque distribution in the transfer case and the myriad competing parameters which affect it. Torque distribution involves issues such as size of the transfer case, torque throughput, size of the clutch, desired operational modes, power consumption of the clutch, duty cycle of the clutch, power transfer demands of the vehicle, desired efficiency and many other physical and functional considerations.

One further consideration when torque distribution and throughput are analyzed is whether the secondary driveline torque must be modulated or whether it may be positively or directly provided such that the transfer case, in effect, achieves a 50—50, or other preselected, torque split between the two drivelines. If the latter is the desiderata, high torque throughput can be achieved with direct coupling but such a configuration then presents the problem of smoothly coupling the drivelines. Obviously, such coupling may occur when a vehicle is stationary, or nearly so, but on-the-fly coupling operation is much more desirable and, in the current market, virtually necessary.

The problem thus reduces itself to providing high torque throughput in a small, i.e., conventionally sized, transfer case also providing on-the-fly direct drive coupling.

SUMMARY OF THE INVENTION

A transfer case includes a clutch assembly having a disc pack clutch, a cone clutch and a lockup hub or collar. All three clutch components are disposed in mechanical parallel between the primary transfer case output shaft and the secondary output. The disc pack clutch includes a plurality of interleaved discs and an electromagnetic operator which effects compression of the disc pack to transfer torque from the primary transfer case output shaft to an intermediate member such as a chain drive sprocket, thence to a chain, and finally to a secondary output shaft. The cone clutch is disposed adjacent the disc pack and is also actuated by the electromagnetic operator. The cone clutch includes a conical drive member driven by the primary transfer case output shaft and a conical driven member provides torque to the drive chain and, in turn, to the secondary output shaft. Preferably, the conical driven member is integrally formed with the chain drive sprocket.

Splined to the conical drive member is a axially moveable lockup hub or clutch collar having gear teeth or splines which mate with complementary gear teeth or splines on the chain drive sprocket. Preferably, a second operator translates the lockup hub. The parallel torque paths provided by the two clutches significantly increase the torque throughput capability of the transfer case and the lockup hub, when actuated, further increases the torque throughput capability of the transfer case while allowing deactivation of the electromagnetic operator and associated disc pack and cone clutches.

A planetary gear speed reduction assembly may also be located within the transfer case. A stub input shaft drives the planetary assembly and a clutch collar selectively couples the input shaft, the reduced speed output from the planetary carrier or neither (to provide neutral) to the primary transfer case output shaft. Through a suitable cam arrangement, the second operator may be utilized to commonly, though independently, select gear ratios and activate the lockup hub.

It is thus an object of the present invention to provide a transfer case having a disc pack clutch, a cone clutch and a lockup mechanism disposed in mechanical parallel between the primary transfer case output shaft and secondary output.

It is a further object of the present invention to provide a clutch assembly having increased torque handling capability in a transfer case for a four-wheel drive vehicle.

It is a still further object of the present invention to provide a transfer case having a lockup mechanism for directly connecting the primary transfer case shaft to the secondary output.

It is a still further object of the present invention to provide a transfer case having a cone clutch, one component of which is integrally formed with a chain drive sprocket.

It is a still further object of the present invention to provide a transfer case having a lockup hub, one component of which is integrally formed with a chain drive sprocket.

It is a still further object of the present invention to provide a disc pack and cone clutch assembly which is capable of modulating torque distribution between the primary transfer case output shaft and associated primary driveline and secondary output shaft and associated secondary driveline.

It is a still further object of the present invention to provide a disc pack and cone clutch assembly controlled by a common operator.

It is a still further object of the present invention to provide a planetary gear speed reduction assembly and lockup hub assembly controlled by a common operator.

It is a still further object of the present invention to provide a transfer case having a planetary gear speed reduction assembly having a direct (high gear) drive, reduced speed (low gear) drive and neutral.

Further objects and advantages of the present invention will become apparent by reference to the following description of the preferred and alternate embodiments and appended drawings wherein like reference numerals refer to the same assembly, component or feature.

DESCRIPTION OF THE PREFERRED EMBODIMENT

Figure 1:
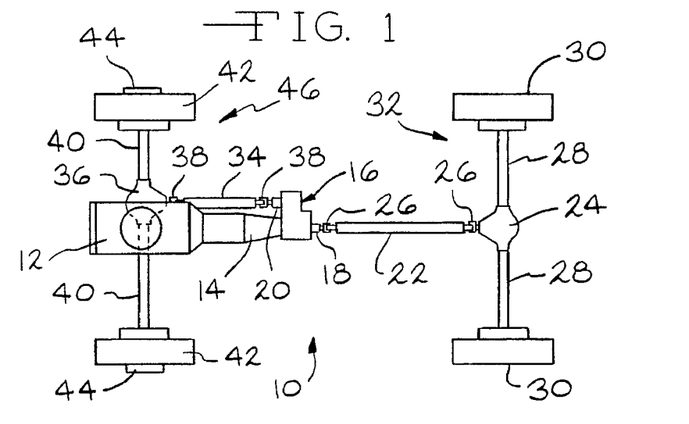
FIG. 1 is a diagrammatic view of a vehicle drive train incorporating a transfer case according to the present invention.

Referring now to FIG. 1, a vehicle drive system incorporating the present invention is illustrated and generally designated by the reference numeral 10. The vehicle drive system 10 includes a prime mover such as an internal combustion engine 12 having an output which is coupled to a transmission 14. The transmission 14, in turn, has an output which is coupled to a transfer case assembly 16 according to the instant invention. The transfer case assembly 16 includes a main or primary, rear output shaft 18 and a secondary, front output shaft 20. The primary output shaft 18 of the transfer case 16 drives a rear drive shaft 22 which delivers power to a rear differential 24. Universal joints 26 are utilized as necessary and in accordance with conventional practice to couple the rear drive shaft 22 to the primary output shaft 18 and the rear differential 24. The output of the rear differential 24 is coupled through rear drive axles 28 to a pair of rear tire and wheel assemblies 30. In the rear wheel drive arrangement illustrated, the rear drive shaft 22, the rear differential 24, the universal joints 26, the rear drive axles 28 and the rear tire and wheel assemblies 30 constitute a primary (full-time) driveline 32.

Similarly, the secondary or front output shaft 20 of the transfer case assembly 16 drives a front drive shaft 34 which delivers power to a front differential 36. Again, appropriate universal joints 38 are utilized as necessary in accordance with conventional practice to couple the secondary output shaft 20 to the front drive shaft 34 and the front differential 36. The front differential 36 delivers power through a pair of front axles 40 to a pair of front tire and wheel assemblies 42. A pair of locking hubs 44 selectively couple the front axles 40 to a respective one of the front tire and wheel assemblies 42. The locking hubs 44 may be either manual, i.e., operator actuated or automatic, i.e., system activated. If the locking hubs 44 are automatic, they preferably include electric, pneumatic or hydraulic actuators (not illustrated) which may be remotely activated. In the rear wheel drive arrangement illustrated, the front drive shaft 34, the front differential 36, the universal joints 38, the front drive axles 40, the front tire and wheel assemblies 42 and the locking hubs 44 constitute a secondary (part-time) driveline 46.

While the primary (full-time) rear wheel drive layout shown and described is considered to be a more typical application of the transfer case assembly 16 according to the present invention, it is anticipated and deemed to be well within the scope of the present invention for the transfer case assembly 16 to be utilized in a vehicle having its primary (full-time) drive wheels located at the front of the vehicle and the secondary (part-time) drive wheels located at the rear.

Figure 2:
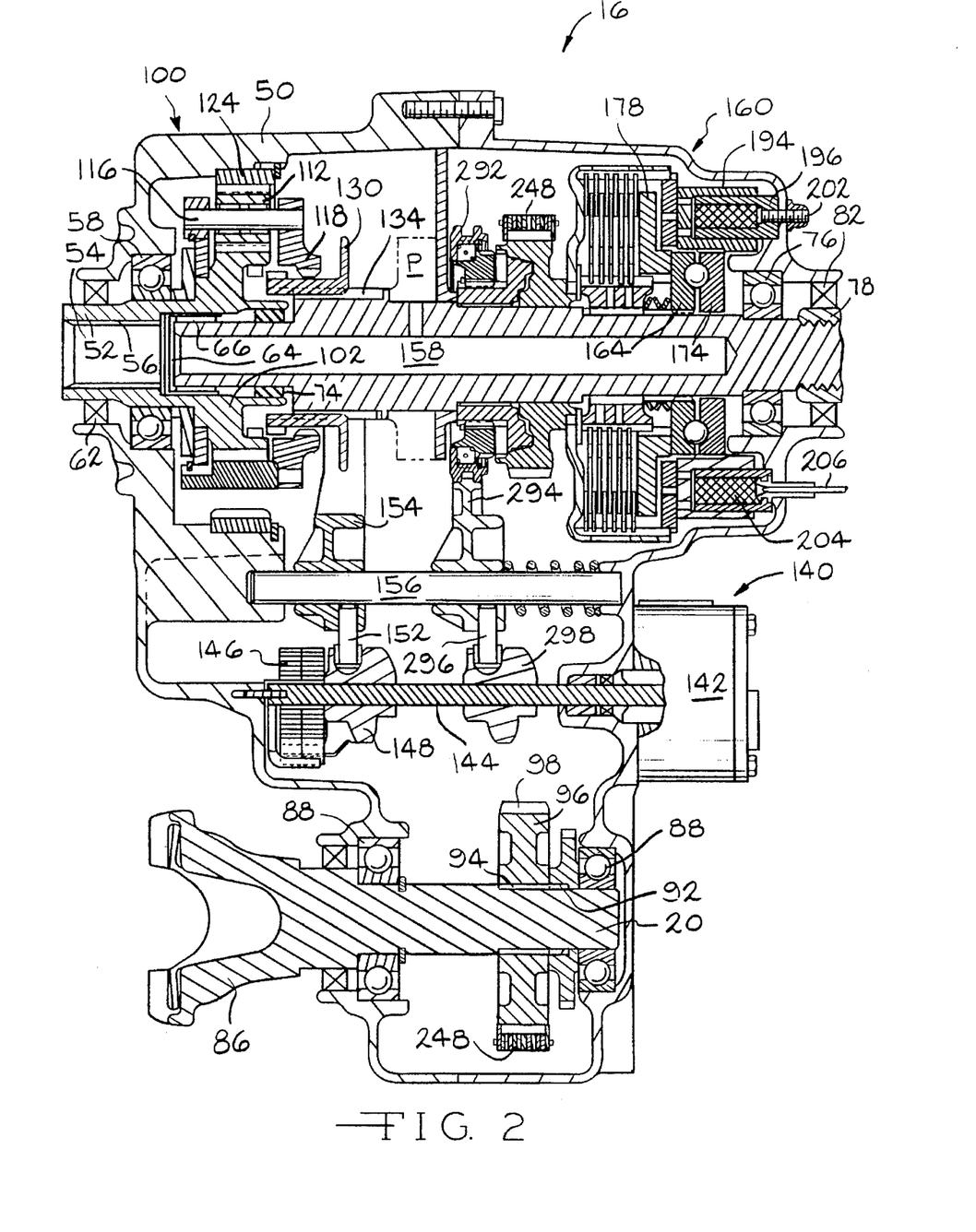
FIG. 2 is a full, sectional view of a transfer case incorporating a clutch assembly according to the present invention.
Figure 3:
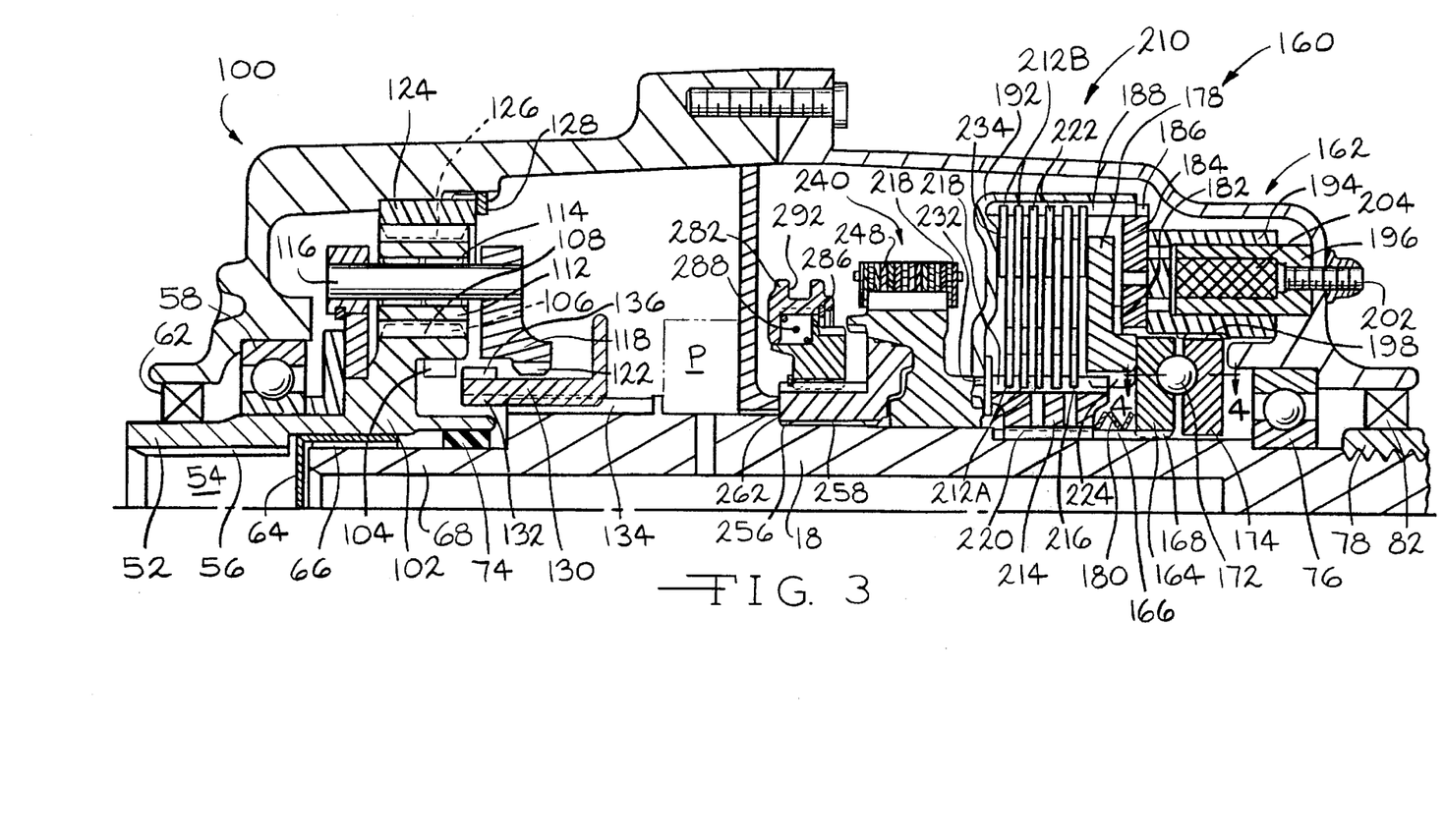
FIG. 3 is an enlarged, sectional view of a portion of a transfer case incorporating a clutch assembly according to the present invention.

Referring now to FIGS. 2 and 3, the transfer case assembly 16 includes a multiple part, typically cast housing 50 having various openings for shafts and fasteners and various mounting surfaces and grooves for shaft seals, bearings, seal retaining grooves and other internal components as will be readily appreciated from inspection of FIGS. 2 and 3. The housing 50 receives a stub input shaft 52 defining a through, stepped bore 54 having a region of first diameter defining a plurality of female splines or gear teeth 56 or other suitable structures for engaging and drivingly receiving a complementarily configured output shaft (not illustrated) of the transmission 14 illustrated in FIG. 1. The input shaft 52 is partially supported upon an anti-friction bearing such as the ball bearing assembly 58. A shaft seal 62 surrounds the input shaft 52 at the forward end of the housing 50.

A larger diameter region of the stepped bore 54 of the input shaft 52 receives a cup shaped shaft seal 64 and a roller bearing 66. The roller bearing assembly 66, in turn, receives and rotatably supports a reduced diameter region 68 of the primary output shaft 18. Adjacent the interior end the input shaft 52 and disposed between the stepped bore 54 and the reduced diameter region 68 of the primary output shaft 18 is an elastomeric shaft seal 74. The opposite end of the primary output shaft 18 is rotatably supported in an anti-friction bearing such as a ball bearing assembly 76. The end of the primary output shaft 18 is preferably threaded and receives a complementarily threaded member 78 which may be conveniently secured to or form a portion of an associated driveline element such as a universal joint 26 illustrated in FIG. 1. A shaft seal 82 disposed between the flange 78 and the housing 50 provides an appropriate seal therebetween.

The housing 50 of the transfer case assembly 16 also receives the secondary or front output shaft 20 which may be integrally formed with or include a fitting or coupling 86 which forms a portion of a universal joint or similar driveline component. The secondary output shaft 20 is supported by a pair of anti-friction bearings such as the ball bearing assemblies 88. The secondary output shaft 20 includes a region of male splines 92. The male splines 92 receive and rotatably engage complementarily configured female involute splines 94 disposed on the inner surface of a driven chain sprocket 96 having chain teeth 98.

The transfer case assembly 16 incorporates a planetary gear speed reduction assembly 100. The planetary gear speed reduction assembly 100 includes a centrally disposed sun gear 102 which is preferably integrally formed on the input shaft 52. The sun gear 102 defines a plurality of female involute splines or gear teeth 104. The sun gear 102 also includes gear teeth 106 disposed about its periphery which drivingly engage complementarily gear teeth 108 formed on a plurality of planet or pinion gears 112, one of which is illustrated in FIGS. 2 and 3. Each of the pinion gears 112 are freely rotatably received upon pairs of roller bearings 114 supported on stub shafts 116 which are mounted and retained within a carrier 118. The carrier 118 includes a plurality of female involute splines or gear teeth 122 disposed generally adjacent but axially offset from the female involute splines or gear teeth 104 on the input shaft 52. A ring gear 124 having gear teeth 126 complementary to the gear teeth 108 of the pinion gears 112 is fixedly secured within the housing 50 in operable alignment with the pinion gears 112 by a snap ring 128.

A sliding clutch collar 130 concentrically disposed about the primary output shaft 18 includes female involute splines or gear teeth 132 which are in constant mesh and driving engagement with complementary male splines or gear teeth 134 disposed on the exterior of the primary output shaft 18. A portion of the clutch collar 130 includes male splines or gear teeth 136 which are complementary to and axially aligned with the female involute splines or gear teeth 122 of the carrier 118 of the planetary gear assembly 100 and the female involute splines or gear teeth 104 on the input shaft 52 and may be selectively engaged therewith.

Axial translation of the clutch collar 130 may thus be effected to selectively couple and directly drive the primary output shaft 18 from the input shaft 52 (high gear) when the clutch collar 130 is in a position to the left of that illustrated in FIGS. 2 and 3 such that the splines or gear teeth 104 and 136 are engaged. When the clutch collar 130 is in a position to the right of that illustrated in FIGS. 2 and 3 such that the splines or gear teeth 122 and 136 are engaged, the primary output shaft 18 is driven by the carrier 118 of the planetary gear speed reduction assembly 100 at a reduced speed (low gear) established by the gear ratio of the planetary gear assembly 100. When the clutch collar 130 is in the position illustrated in FIGS. 2 and 3, there is no driving connection between the input shaft 52 and the primary output shaft 18 and the transfer case assembly 16 is in neutral.

Axial translation of the clutch collar 130 and selection of either direct drive, reduced speed drive or neutral is achieved by an electromechanical actuator assembly 140. The electromechanical actuator assembly 140 includes an electric, pneumatic or hydraulic drive motor 142 which incrementally rotates a shaft 144. The shaft 144 drives an energy storing flat coil spring 146 which, in turn, drives a cam assembly 148. A cam follower pin 152 seats within a pathway in the cam assembly 148 and, as the shaft 144 and the cam 148 rotate, the pin 152 bi-directionally translates a shift fork 154 along a cylindrical bearing 156. As noted, the flat coil spring 146 provides a resilient, energy storing interconnection between the drive motor 142 (and the shaft 144) and the shift fork 154 whereby the shift motor 142 may reach a desired position but the shift fork 154 and clutch collar 130 may not move into a corresponding desired position until forces acting upon the clutch collar 130 have lessened to a point where energy stored in the spring 146 will complete the shift commanded by the drive motor 142.

A gerotor pump P illustrated in phantom lines is disposed about the primary output shaft 18 and provides a pressurized flow of cooling lubricant to an axial bore 158 concentrically disposed within the primary output shaft 18. The bore 158 communicates with a plurality of radial ports (not illustrated) which provide the cooling lubricant to various components within the transfer case assembly 16 according to conventional practice.

Figure 4:
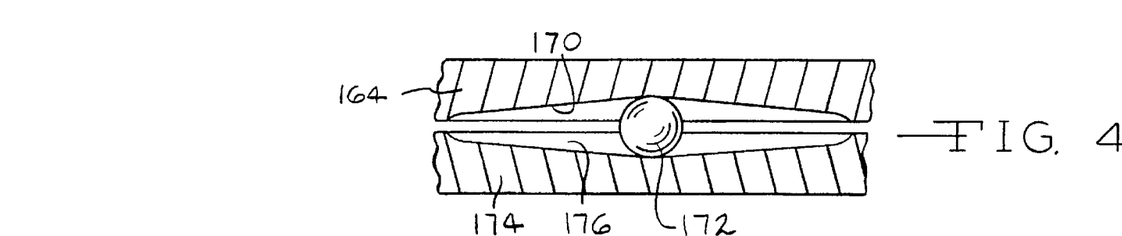
FIG. 4 is a flat pattern development of a clutch ball and associated recesses incorporated in a clutch assembly according to the present invention taken along line 4—4 of FIG. 3.
Figure 5:
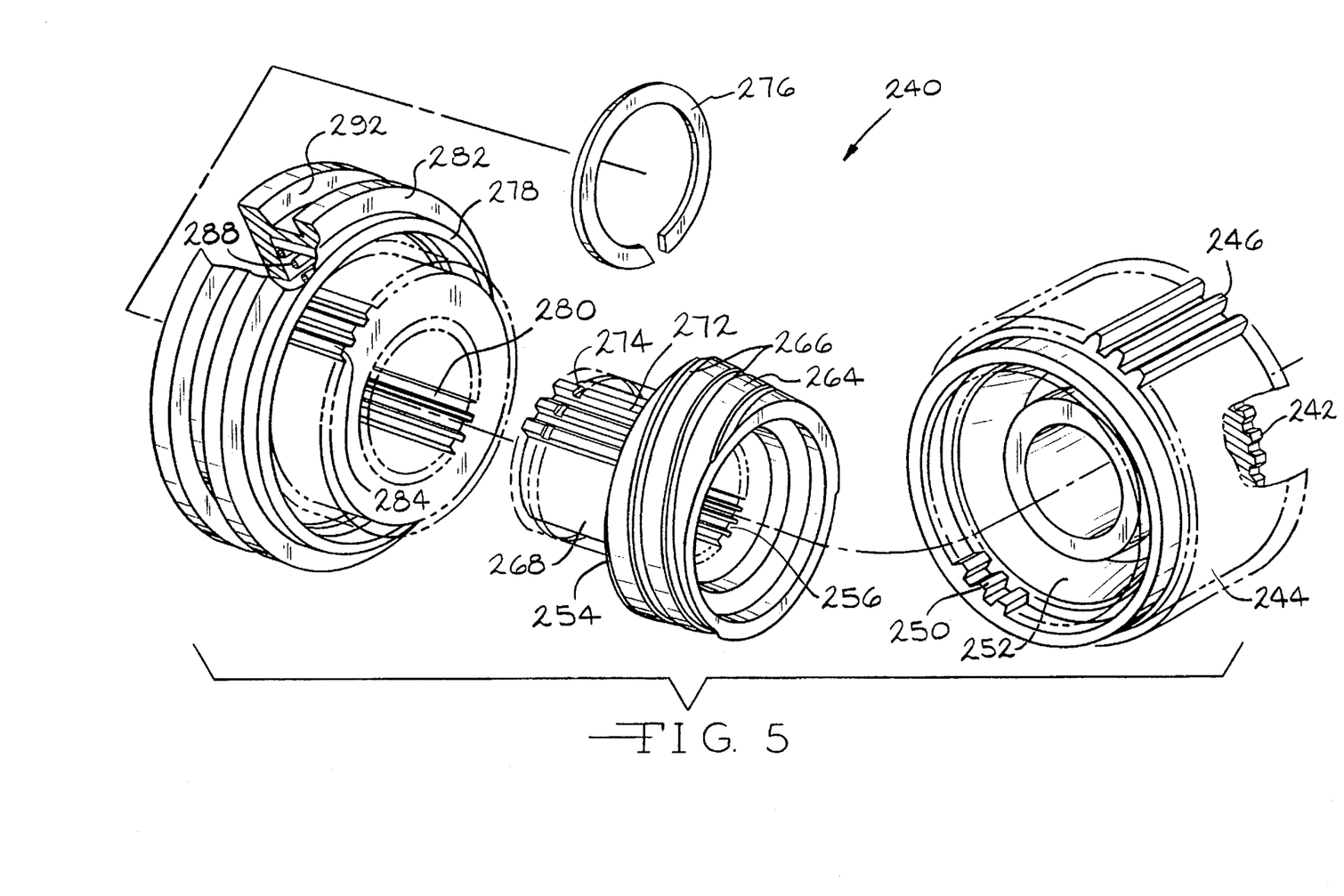
FIG. 5 is an exploded perspective view of the cone clutch and lockup mechanism of a clutch assembly according to the present invention.

Referring now to FIGS. 2, 3 and 4 the transfer case assembly 16 also includes electromagnetically actuated disc pack and cone clutch assembly 160. The disc pack and cone clutch assembly 160 is disposed about the output shaft 18 and preferably includes a single operator or actuator assembly 162 having a circular drive member 164 coupled to the output shaft 18 through male splines or gear teeth 166 on the output shaft 18 and complementary female involute splines or gear teeth 168 on the circular drive member 164. One face of the circular drive member 164 includes a plurality of circumferentially spaced apart recesses 170 in the shape of an oblique section of a helical torus, as illustrated in FIG. 5. Each of the plurality of recesses 170 receives one of a like plurality of load transferring balls 172.

A circular driven member 174 disposed adjacent the circular drive member 164 includes a like plurality of recesses 176 on an opposing face which define the same shape as the recesses 170. The oblique sidewalls of the recesses 170 and 176 function as ramps or cams and cooperate with the balls 172 to drive the circular members 164 and 174 axially apart in response to relative rotation therebetween. It will be appreciated that the recesses 170 and 176 and the load transferring balls 172 may be replaced with other analogous mechanical elements which cause axial displacement of the circular members 164 and 174 in response to relative rotation therebetween. For example, tapered rollers disposed in complementarily configured conical helices may be utilized.

The circular drive member 164 is secured to or integrally formed with a radially outwardly extending apply plate 178. A compression spring 180 is concentrically disposed about the output shaft 18 adjacent the circular drive member 164. The compression spring 180 may include a plurality of Belleville springs or wave washers. The compression spring 180 provides a biasing or restoring force to the circular drive member 164 and the apply plate 178 urging them to the right as illustrated in FIGS. 2 and 3. Behind, i.e., to the right of, the apply plate 178 and generally aligned therewith is a circular flat washer 182. Adjacent the flat washer 182 is a clutch armature 184. The clutch armature 184 includes a plurality of male splines or gear teeth 186 disposed about its periphery which engage a complementary plurality of female involute splines or gear teeth 188 which extend axially along the inner surface of a cylindrical portion of a bell shaped clutch housing 192.

Positioned adjacent the face of the armature 184 opposite the flat washer 182 and the apply plate 176 is a circular coil housing 194. The coil housing 194 is freely rotatably received upon a complementarily configured stationary mounting annulus 196. The coil housing 194 is coupled to and rotates with the circular driven member 174 by virtue of a splined interconnection 198 or other securement such as a friction fit. The mounting annulus 196 is secured to the housing 50 of the transfer case assembly 16 by a plurality of suitable fasteners 202, one of which is illustrated in FIGS. 2 and 3. The mounting annulus 196 receives an electromagnetic coil 204 which is connected to a source of electrical energy through a conductor 206.

Adjacent the apply plate 178 and contained within the clutch housing 192 is a disc pack assembly 210. The disc pack assembly 210 includes a plurality of interleaved friction plates or discs 212. A first plurality of smaller diameter discs 212(A) are received upon an intermediate collar 214 and rotatably driven thereby through female splines 216 on the discs 212(A) and male splines 218 on the intermediate collar 214. The intermediate collar 214 is, in turn, rotatably driven by the primary output shaft 18 through a splined interconnection 220. A second plurality of larger diameter discs 212(B) are interleaved with the first plurality of discs 212(A) and include splines 222 about their peripheries which engage the female splines or gear teeth 188 on the inner surface of the cylindrical portion of the clutch housing 192 and rotate therewith. Female involute splines or gear teeth 224 on the apply plate 178 couple the apply plate to the male splines 218 on the intermediate collar 214 and, in turn, to the primary output shaft 18.

The clutch housing 192 is concentrically disposed about the primary output shaft 18 and includes a plurality of female involute splines or gear teeth 232 about an aperture in the radially extending end wall 234 of the clutch housing 192.

Referring now to FIGS. 3 and 5, a cone clutch and lockup assembly 240 is concentrically disposed about the primary output shaft 18 adjacent the end wall 234 of the clutch housing 192. The female involute splines 232 of the clutch housing 192 engage complementarily configured male splines or gear teeth 242 adjacent an end face of a chain drive sprocket 244. The chain drive sprocket 244, which is also the driven member of the cone clutch and lockup assembly 240, is freely rotationally disposed about the primary output shaft 18 and includes chain drive teeth 246 about its periphery which engage a drive chain 248. The drive chain 248 transfers power to the driven chain sprocket 96 coupled to the secondary output shaft 20.

A plurality of female involute splines or gear teeth 250 are disposed adjacent one end of the chain drive sprocket 244.

The chain drive sprocket 244 includes an interior frustoconical surface 252 oriented at a small acute angle of between about 8° and 14° to the axis of the output shaft 18. An angle of 12.5° has been found to be preferable. Shallower angles provide good mechanical advantage but can present torque transfer control difficulties. Steeper angles provide good control but provide reduced mechanical advantage and thus require greater engagement force to transfer a given torque.

The cone clutch and lockup assembly 240 also includes a cone clutch drive member 254. The cone clutch drive member 254 includes a plurality of female involute or gear teeth splines 256 disposed in a concentric passageway which are received upon complementarily configured gear teeth or male splines 258 formed in the primary output shaft 18 at an appropriate axial location. The male splines 258 extend over a limited axial distance and create a shoulder or stop 262 on the primary output shaft 18 against which the clutch drive member 254 abuts. The clutch drive member 254 includes an exterior frustoconical surface 264 oriented at the same angle to the axis of the primary output shaft 18 as the interior frusto-conical surface 252 of the chain drive sprocket 244. The frusto-conical surfaces 252 and 264 function as clutch or friction surfaces and provide a torque path therebetween which is in mechanical parallel with the torque path through the disc pack assembly 210.

A plurality of lubrication grooves or channels 266 are formed on the exterior frusto-conical surface 264 of the clutch drive member 254. The channels 266 provide for the passage of lubricating fluid supplied by the gerotor pump P along and between the surfaces 252 and 264 of the cone clutch and lockup assembly 240. The channels 266 are preferably of a generally L-shaped configuration in cross-section wherein the short leg of the "L" is oriented radially and the long leg of the "L" is oriented parallel to the axis of the cone clutch drive member 254.

The cone clutch drive member 254 also defines a cylindrical projection 268 having a plurality of male splines or gear teeth 272 arranged about its exterior surface. The male splines 272 define a circumferential groove 274 which receives a snap ring 276. The snap ring 276 retains a clutch hub or collar 278 on the cylindrical projection 268 of the cone clutch drive member 254. The clutch collar 278 defines a plurality of female involute splines or gear teeth 280 which are complementary to and engage the male splines 272 disposed upon the cylindrical projection 268 of the cone clutch drive member 254. It will be appreciated that the snap ring 276 retains the clutch collar 278 upon the cone clutch drive member 254 while permitting limited axial translation therebetween.

The clutch collar 278 further includes male splines or gear teeth 284 about its periphery which are complementarily disposed and configured to engage the female involute splines or gear teeth 250 on the chain drive sprocket 244. Axial translation of the clutch collar 278 to the right as illustrated in FIG. 3 thus directly couples the cone clutch drive member 254 to the chain drive sprocket 244 thereby providing a direct, positive coupling and torque transfer from the primary output shaft 18 to the secondary output shaft 20 and effectively bypassing the torque transfer path between the frusto-conical surfaces 252 and 264 of the cone clutch and lockup assembly 240 and the discs 212A and 212B of the disc pack assembly 210.

Bi-directional axial translation of the clutch collar 278 is achieved through bi-directional axial translation of a shift collar 282. The shift collar 282 is disposed about the clutch collar 278 and retained thereupon by a snap ring 286. A compression spring 288 provides a resilient connection between the shift collar 282 and the clutch collar 278. That is, the shift collar 282 may be positively translated by an associated mechanism described below whereas engagement of the gear teeth or splines 250 and 284 and corresponding translation of the clutch collar 278 may be momentarily delayed until appropriate alignment of the gear teeth or splines 250 and 284 and spaces occur.

The shift collar 282 defines a circumferential groove 292 which receives a shift fork 294 (illustrated in FIG. 2). The shift fork 294 is slidably received upon the cylindrical bearing 156. Axial translation of the shift fork 294 is achieved by corresponding axial translation of a cam follower pin 296 which is received within a suitably configured cam pathway in a cam assembly 298. The cam assembly 298 is secured to the shaft 144. Rotation of the drive motor 142 and the shaft 144 achieves appropriate axial translation of the shift fork 294 as will be readily understood. The arrangement and configuration of the cam pathways in the cam assemblies 148 and 298 permit simultaneous or sequential selection of the gear ranges of the planetary gear assembly 100 and engagement or disengagement of the clutch collar 278.

DESCRIPTION OF THE ALTERNATE EMBODIMENT

Figure 6:
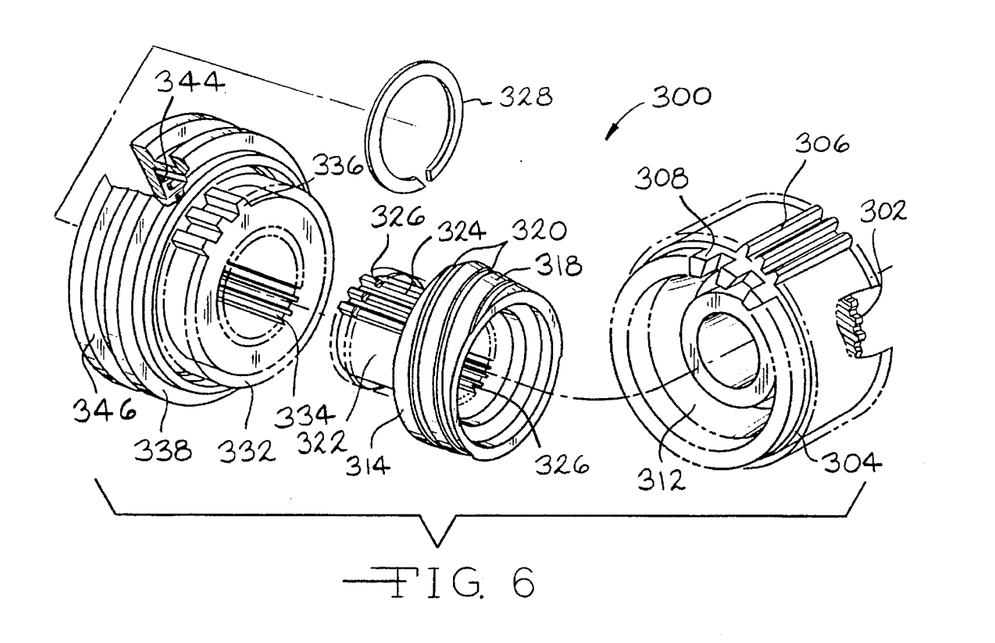
FIG. 6 is an exploded perspective view of an alternate embodiment of the cone clutch and lockup mechanism of a clutch assembly according to the present invention.

Referring now to FIGS. 2, 3 and 6, an alternate embodiment cone clutch assembly 300 is illustrated. The alternate embodiment cone clutch and lockup assembly 300 is disposed about the primary output shaft 18 adjacent the end wall 234 of the clutch housing 192. The female involute splines 232 of the clutch housing 192 engage complementarily configured male splines or gear teeth 302 adjacent and end face of a chain drive sprocket 304. The chain drive sprocket 304, which is also the driven member of the alternate embodiment cone clutch assembly 300, is freely rotationally disposed about the primary output shaft 18. Arranged about the periphery of the chain drive sprocket 304 are a plurality of chain drive teeth 306 which engage the drive chain 248. The drive chain 248 transfers power to the driven sprocket 96 and the secondary output shaft 20, as noted above.

A plurality of radially arrayed, axially extending lugs 308 are disposed about the end of the chain drive sprocket 304 opposite the gear teeth 302. The chain drive sprocket 304 also includes an interior frustoconical surface 312 which, in all respects, is identical to the interior frusto-conical surface 252 on the chain drive sprocket 244.

The alternate embodiment cone clutch assembly 300 also includes a cone clutch drive member 314. The cone clutch drive member 314 includes a plurality of female involute splines or gear teeth 316 disposed in a concentric passageway which are received upon complementarily configured male splines or gear teeth 258 formed in the primary output shaft 18 at an appropriate axial location. As noted above, the termination of the male splines 258 define a shoulder or stop 262 against which the cone clutch drive member 314 abuts. The cone clutch drive member 314 includes an exterior frusto-conical surface 318 oriented at the same angle relative to the axis of the primary output shaft 18 as the interior frusto-conical surface 312 of the chain drive sprocket 304. The frusto-conical surfaces 312 and 318 function as clutch or friction surfaces and provide a torque path therebetween which is in mechanical parallel with the torque path through the disc pack assembly 210. A plurality of "L" shaped lubrication channels or grooves 320 are formed in the exterior frusto-conical surface 318 of the cone clutch drive member 314 and provide for passage of lubricating fluid, also as noted above.

The cone clutch drive member 314 further defines a circular projection 322 having a plurality of male splines or gear teeth 324 arranged about its exterior surface. The male splines 324 define a circumferential groove 326 which receives a snap ring 328. The snap ring 328 retains a clutch collar 332 on the cylindrical projection 322 of the cone clutch drive member 314. The clutch collar 332 has a central through opening and defines a plurality of female involute splines or gear teeth 334 which are complementary to and engage the male splines 324 disposed upon the cylindrical region 322 of the cone clutch drive member 314. The snap ring 328 is positioned such that the clutch collar 332 enjoys limited axial translation upon the cylindrical projection 322 of the cone clutch drive member 314 and is also retained thereupon. The clutch collar 332 also further includes male splines or lugs 336 about its periphery which are complementarily disposed and configured to engage the lugs 308 on the chain drive sprocket 304. Axial translation of the clutch collar 332 to the right as illustrated in FIG. 3 thus directly couples and locks the cone clutch drive member 314 to the chain drive sprocket 304 thereby directly rotationally coupling the primary output shaft 18 and the secondary output shaft 20.

Axial translation of the clutch collar 332 is achieved through corresponding axial translation of a shift collar 338. The shift collar 338 is disposed about the clutch collar 332 and retained thereupon by a snap ring (not illustrated). A compression spring 344 provides a resilient connection between the shift collar 338 and the clutch collar 332. The shift collar 338 defines a circumferential groove 346 which receives a shift fork 294.

Operation of the transfer case assembly 16 will now be described. Typically, the position of the clutch collar 130 of the planetary gear assembly 100 will initially be adjusted to provide either high range (direct drive), neutral or low range (reduced speed drive) by appropriate operation of the drive motor 142. As noted above, this operational step comprehends engagement of either the splines 132 on the clutch collar 130 with the female splines 104 on the input shaft 52 to provide direct drive, engagement of the splines 136 of the clutch collar 130 with the splines 122 on the carrier 118 to provide reduced speed drive or selection of a neutral position wherein neither of the foregoing spline engagements occurs.

In conjunction with the foregoing gear selection, actuation of the electromagnetically actuated disc pack and cone clutch assembly 160 selectively transfers torque from the primary output shaft 18 and the associated primary driveline 32 to the secondary output shaft 20 and the associated secondary driveline 46. Electrical energy is supplied to the electromagnetic coil 204 through a conductor 206 and may be adjusted either in analog magnitude or through duty cycle manipulation techniques such as pulse width modulation (PWM) or other modulation techniques to cause corresponding control of the magnitude of torque transfer between the primary output shaft 18 and the secondary output shaft 20.

As drag created on the circular coil housing 194 by the magnetic field generated by the electromagnetic coil 204 increases, relative rotation occurs between the circular drive member 164 and the circular driven member 174 such that the balls 172 separate the members 164 and 174 and the apply plate 178 begins to apply compressive force to the disc pack and cone clutch assembly 160. From the clutch force actuation standpoint, the disc pack assembly 210 and the cone clutch and lockup assembly 240 are in a stacked or series arrangement such that the compressive force generated by the balls 172 disposed between the circular members 164 and 174 is applied by the apply plate 178 to the disc pack assembly 210 and thence to the cone clutch and lockup assembly 240. Opposing (reaction) forces are transmitted in the opposite direction from the cone clutch and lockup assembly 240, through the disc pack assembly 210 and the apply plate 178 to the circular drive and driven members 164 and 174.

Torque transfer between the primary output shaft 18 and the secondary output shaft 20 through the disc pack assembly 210 and the cone clutch and lockup assembly 240, however, is achieved in parallel, that is, the disc pack assembly 210 and the cone clutch and lockup assembly 240 represent independent, though mechanically parallel, torque transfer paths between the primary output shaft 18 and the secondary output shaft 20.

By virtue of the parallel torque transfer paths through the two clutch assemblies 210 and 240, the torque capability of a conventional, prior art transfer case rated at approximately 350 pounds.feet may be increased through the use of the present invention to, for example, about 500 pounds.feet. This substantial torque throughput increase is achieved with no increase in the size of the transfer case assembly 16.

Driving conditions and situations may occur in which no modulation of torque distribution between the primary output shaft 18 and the secondary output shaft 20 is necessary or desirable and a positive, direct coupling between the two shafts and associated drivelines is. In such circumstances, the shift drive motor 142 is activated to translate the shift fork 294 to the left as viewed in the drawings, to positively engage the clutch collar 278 with the chain drive sprocket 244, thereby positively and directly coupling the primary output shaft 18 to the secondary output shaft 20 through the drive chain 248. As noted above, given appropriate configurations of the cam followers 148 and 298, the shift drive motor 142 may readily select such direct drive through the clutch collar 278 and chain drive sprocket 244 in combination with either direct drive or reduced speed drive through the planetary gear assembly 100. It will be appreciated that in this direct (non-modulating or lockup) drive mode, drive energy to the disc pack and cone clutch assembly 160 may be terminated thereby saving energy and relaxing the components and reducing wear thereof.

The foregoing disclosure is the best mode devised by the inventors for practicing this invention. It is apparent, however, that devices incorporating modifications and variations will be obvious to one skilled in the art of transfer case clutches. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A driveline clutch assembly comprising, in combination, a first shaft for providing power to a first driveline, a second shaft for providing power to a second driveline, a disc pack clutch operably disposed between said first shaft and said second shaft, a cone clutch operably disposed between said first shaft and said second shaft, said cone clutch including a first member driven by said first shaft and a second member driving said second shaft, said disc pack clutch and said cone clutch disposed in mechanical parallel for providing modulatable coupling between said first shaft and said second shaft, and a lockup clutch operably disposed between said first shaft and said second shaft for positively coupling said first shaft and said second shaft.

2. The driveline clutch assembly of claim 1 further including an actuator for controlling torque transfer through said disc pack clutch and said cone clutch.

3. The driveline clutch assembly of claim 1 further including an operator for engaging said lockup clutch.

4. The driveline clutch assembly of claim 3 further including a resilient member operably disposed between said operator and said lockup clutch.

5. The driveline clutch assembly of claim 4 wherein said resilient member is a spring.

6. The driveline clutch assembly of claim 1 wherein said second member is a chain drive sprocket.

7. The driveline clutch assembly of claim 1 wherein said second member is a chain drive sprocket and said lockup clutch includes a first plurality of teeth disposed on said drive sprocket and a clutch collar having a second plurality of teeth complementary to and selectively engageable with said first plurality of teeth.

8. The driveline clutch assembly of claim 1 wherein one of said cone clutch members includes a frusto-conical surface having at least one helical channel formed therein.

9. The driveline clutch assembly of claim 2 wherein said actuator includes an electromagnetic coil and said actuator provides activating force to said disc pack and said cone clutches.

10. A transfer case assembly for a vehicle comprising, in combination, a first output member for driving a first driveline, a second output member for driving a second driveline, a disc pack clutch and a cone clutch operably disposed in mechanical parallel between said first output member and said second output member, an actuator for controlling torque transfer through said clutches from said first output member to said second output member, and a lockup clutch operably disposed between said first output member and said second output member, and an operator linked to said lockup clutch for selectively, positively coupling said input member and said output member.

11. The transfer case assembly of claim 10 wherein said actuator is an electromagnetic coil and said actuator provides compressive force to said disc pack and said cone clutches.

12. The transfer case assembly of claim 10 wherein said disc pack clutch includes a first plurality of clutch discs rotating with said first output member and a second plurality of clutch discs interleaved with said first plurality of clutch discs operably coupled to said second output member.

13. The transfer case assembly of claim 10 wherein said cone clutch includes a first member driven by said first output member and a second member operably coupled to said second output member.

14. The transfer case assembly of claim 13 wherein said second member of said cone clutch is a chain drive sprocket disposed about said first output shaft.

15. The transfer case assembly of claim 10 further including an input shaft, a planetary gear assembly having a reduced speed output and a clutch collar drivingly engaging said first output shaft and selectively engageable with said input shaft or said reduced speed output.

16. A clutch assembly comprising, in combination, an input member, an output member, a disc pack clutch operably disposed between said input member and said output member, a cone clutch operably disposed between said input member and said output member, means acting upon said disc pack clutch and said cone clutch for modulating torque transfer from said input member to said output member, a lockup clutch operably disposed between said input member and said output member, and means acting upon said lockup clutch for selectively, positively connecting said input member and said output member.

17. The clutch assembly of claim 16 wherein said output member is a chain drive sprocket.

18. The clutch assembly of claim 16 wherein said cone clutch includes a first clutch member driven by said input member and having a frusto-conical first clutch surface and said output member has a frusto-conical second clutch surface disposed in operable relationship with said first frusto-conical clutch surface.

19. The clutch assembly of claim 16 wherein said means acting upon said disc pack and cone clutches is an apply plate and said means acting upon said lockup clutch is a shift fork.

20. The clutch assembly of claim 16 wherein said means acting upon said disc pack and cone clutches includes an electromagnetic coil and two adjacent circular members defining a plurality of pairs of opposed camming recesses, each of said pair of recesses receiving a ball.

* * * * *